(12) United States Patent
Tesinsky

(10) Patent No.: US 8,720,373 B1
(45) Date of Patent: May 13, 2014

(54) BALE HOLDER

(71) Applicant: Vincent E. Tesinsky, Weston, NE (US)

(72) Inventor: Vincent E. Tesinsky, Weston, NE (US)

(*) Notice: Subject to any disclaimer, the term of this patent is extended or adjusted under 35 U.S.C. 154(b) by 41 days.

(21) Appl. No.: 13/645,936

(22) Filed: Oct. 5, 2012

(51) Int. Cl.
*A01K 1/10* (2006.01)
*A01K 5/00* (2006.01)

(52) U.S. Cl.
CPC .... *A01K 1/10* (2013.01); *A01K 5/00* (2013.01)
USPC .......................................... 119/60; 119/61.2

(58) Field of Classification Search
CPC ....................................................... A01K 1/10
USPC ......... 119/58, 59, 60, 61.1, 62, 63, 61.2, 61.4
See application file for complete search history.

(56) References Cited

U.S. PATENT DOCUMENTS

| | | | |
|---|---|---|---|
| 3,020,881 A | 2/1962 | Strom | |
| 3,596,777 A * | 8/1971 | Neely, Jr. | 414/789.4 |
| 3,802,394 A * | 4/1974 | Mahler | 119/51.5 |
| 4,580,843 A * | 4/1986 | Lund | 298/18 |
| 5,331,922 A * | 7/1994 | Olynyk | 119/60 |
| 5,345,893 A | 9/1994 | Morris | |
| 5,361,724 A * | 11/1994 | Kuhns | 119/60 |
| 5,582,131 A * | 12/1996 | Curtis | 119/51.11 |
| 7,418,924 B2 * | 9/2008 | Klene | 119/60 |
| 7,685,968 B2 * | 3/2010 | Cooper | 119/58 |
| 2009/0274546 A1 * | 11/2009 | Crutchfield | 414/801 |
| 2010/0147223 A1 * | 6/2010 | Kruse et al. | 119/57.5 |
| 2010/0150692 A1 * | 6/2010 | Digman | 414/518 |
| 2011/0253053 A1 * | 10/2011 | Kurtz | 119/60 |

* cited by examiner

*Primary Examiner* — Son T Nguyen
(74) *Attorney, Agent, or Firm* — Dennis L. Thomte; Thomte Patent Law Office LLC

(57) ABSTRACT

A bale holder for use with a bale feeder having an open upper end. The bale holder includes an upstanding framework, having an open upper end, which is secured to the upper end of the bale feeder. The bale holder includes a selectively pivotal door which extends over a portion of the upper end of the framework. The door is movable between a bale supporting position to a second position. A stand-by bale may be supported on the door and the upper end of the framework when the door is in its bale supporting position. When the door moves from its bale supporting position to its second position, the stand-by bale drops downwardly into the bale feeder.

7 Claims, 8 Drawing Sheets

BALE HOLDER

BACKGROUND OF THE INVENTION

1. Field of the Invention

This invention relates to a bale holder which supports a back-up bale over a bale feeder having a bale positioned therein. The back-up bale is dropped downwardly into the bale feeder when the bale therein has been consumed by the livestock being fed.

2. Description of the Related Art

Many types of bale feeders have been previously provided to enable feed bales to be consumed by livestock. Some of the bale feeders are circular, some are square and some are rectangular. Most prior art bale feeders have a plurality of spaced-apart bars or supports which prevent the livestock from entering the interior of the bale feeder but which permit the livestock to extend their heads and necks through the opening between the bars or supports to gain access to the hay bale therein.

Usually, a front-end loader mounted on a tractor or skid-steer vehicle is used to place a single hay bale in the bale feeder. When that bale is consumed, another bale must be placed in the feeder which means that the tractor operator must make two trips out to the feed lot, one trip for the first bale and a second trip for the second bale. Further, a qualified tractor operator is required for depositing the first and second bales in the feeder.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The bale holder of this invention is used with an upstanding bale feeder enclosure having a lower end and an open upper end to permit a bale to be placed within the bale feeder enclosure. The bale feeder enclosure has a plurality of openings formed therein to enable an animal to gain access to the bale within the feeder enclosure. The bale holder of this invention comprises an upstanding framework having an open lower end and an open upper end. The lower end of the framework is secured to the upper end of the bale feeder enclosure whereby the open lower end of the framework is positioned above the open upper end of the bale feeder enclosure. A door is pivotally secured to the upper end of the framework about a horizontal axis with the door being movable from a bale supporting position to a second position with respect to the upper end of the framework. The door, when in the bale supporting position, extends partially over the open upper end of the framework whereby a stand-by bale or a back-up bale may be supported on the door and the upper end of the framework above a bale positioned in the bale feeder enclosure.

The bale holder also includes a latching mechanism which is interconnected to the door and the framework. The latching mechanism is selectively movable between a latched and unlatched position. The latching mechanism, when in the latched position, maintains the door in the bale supporting position. The latching mechanism, when being moved from the latched position to the unlatched position, permits the door to pivotally move, by the weight of the bale thereon, to the second position thereby permitting the back-up bale thereon to drop downwardly into the bale feeder enclosure.

It is therefore a principal object of the invention to provide an improved bale feeder.

A further object of the invention is to provide a bale holder for use with a conventional bale feeder whereby a stand-by or back-up bale may be supported above the bale within the bale feeder.

A further object of the invention is to provide a bale holder which may be selectively detachably secured to an existing bale feeder.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
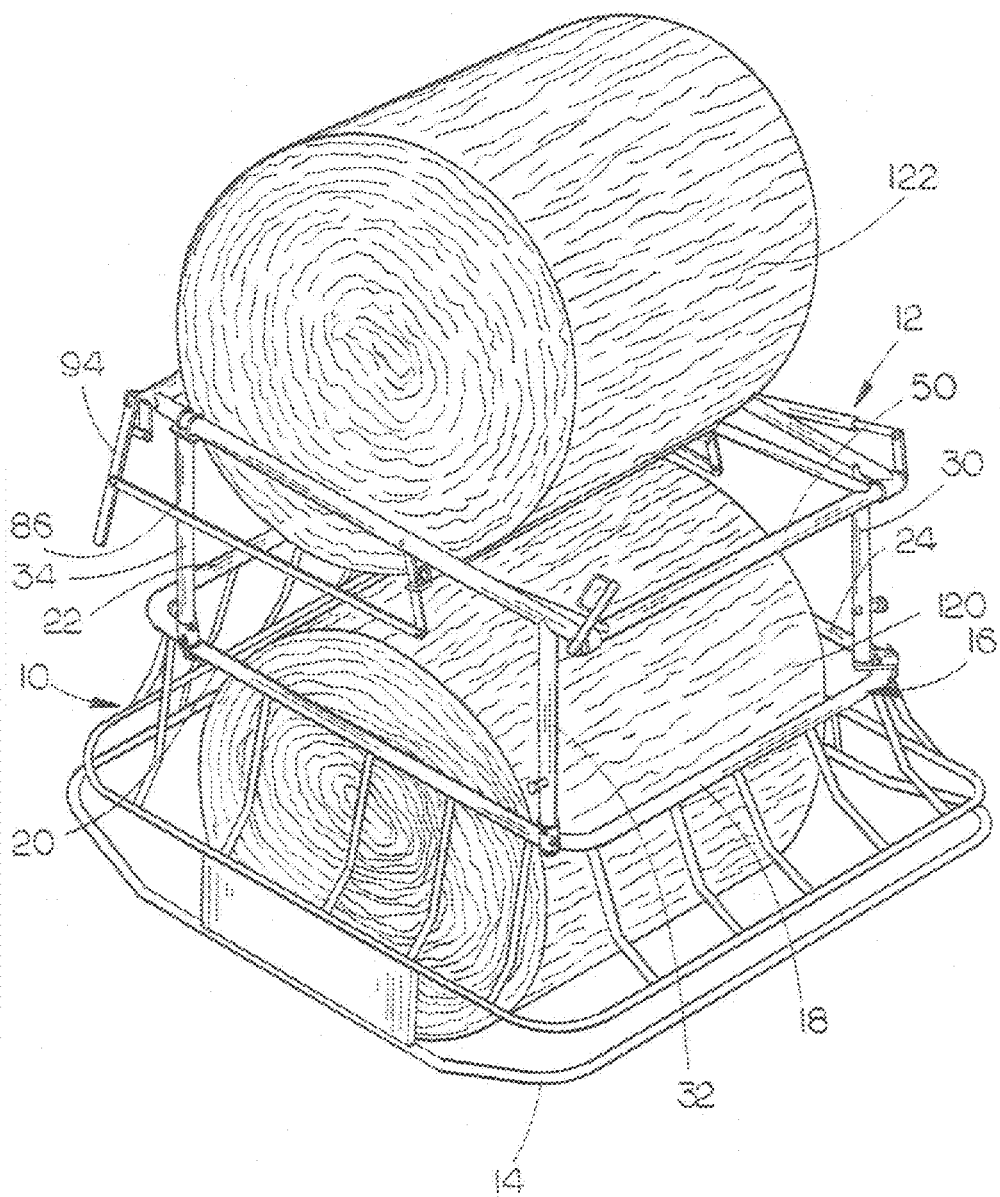
FIG. 1 is a perspective view illustrating the bale holder of this invention mounted on the upper end of a bale feeder with the bale feeder having a bale positioned therein and which illustrates the bale holder supporting a bale above the bale in the bale feeder.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional bale feeder such as manufactured by Go Bob. Although the drawings illustrate a bale feeder having a square configuration, Applicant's bale holder 12 could be used on rectangular bale feeders or circular (round) bale feeders. Applicant's invention will be discussed in detail as it would be mounted on a feeder having a square configuration.

Feeder 10 includes a lower end 14 and an upper end 16 defined by frame members 18, 20, 22 and 24. Feeder 10 includes a plurality of spaced-apart bars or sections 26 defining feed openings 28 therebetween.

Figure 3:
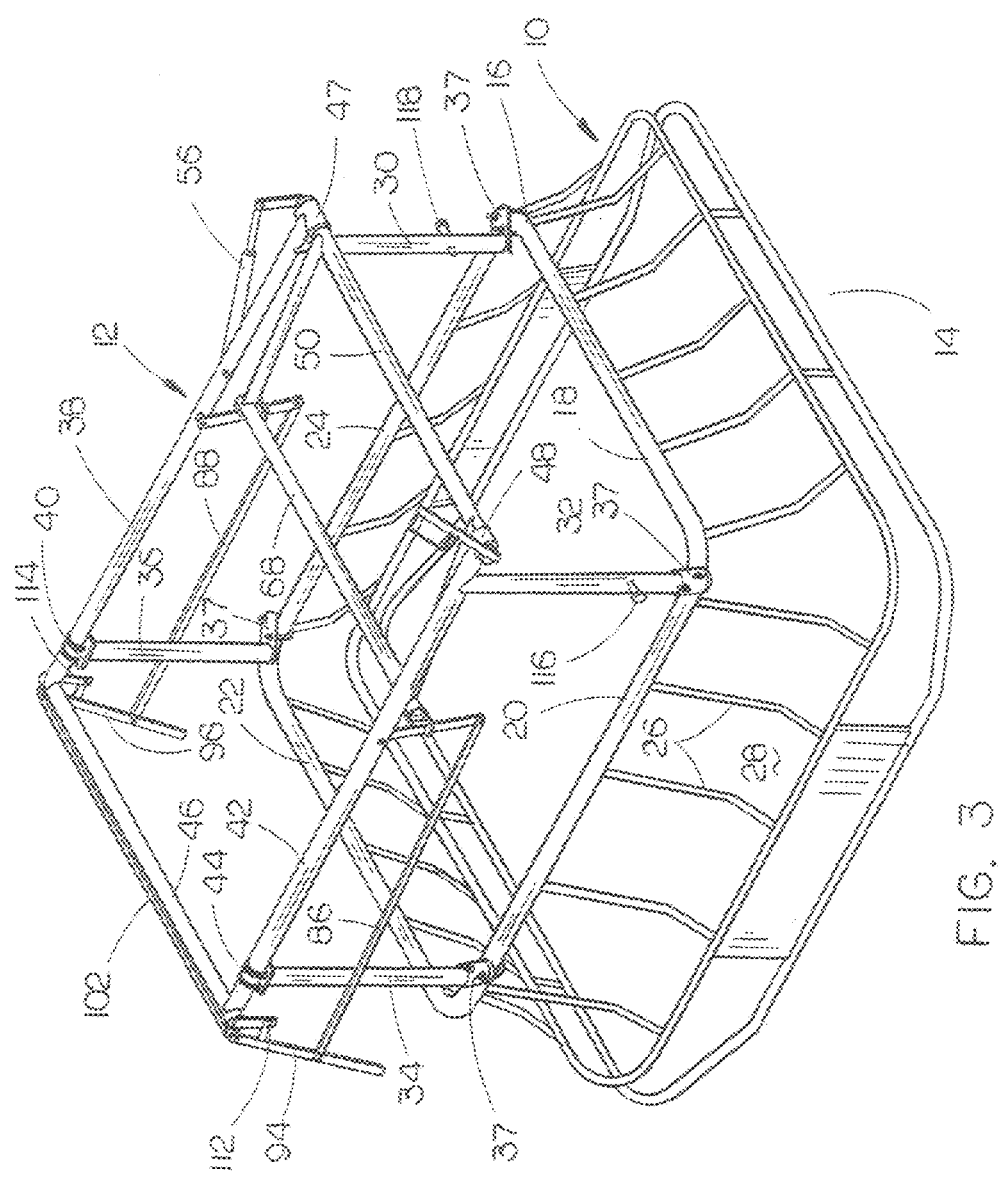
FIG. 3 is a perspective view of the bale holder positioned on the upper end of a bale feeder.
Figure 4:
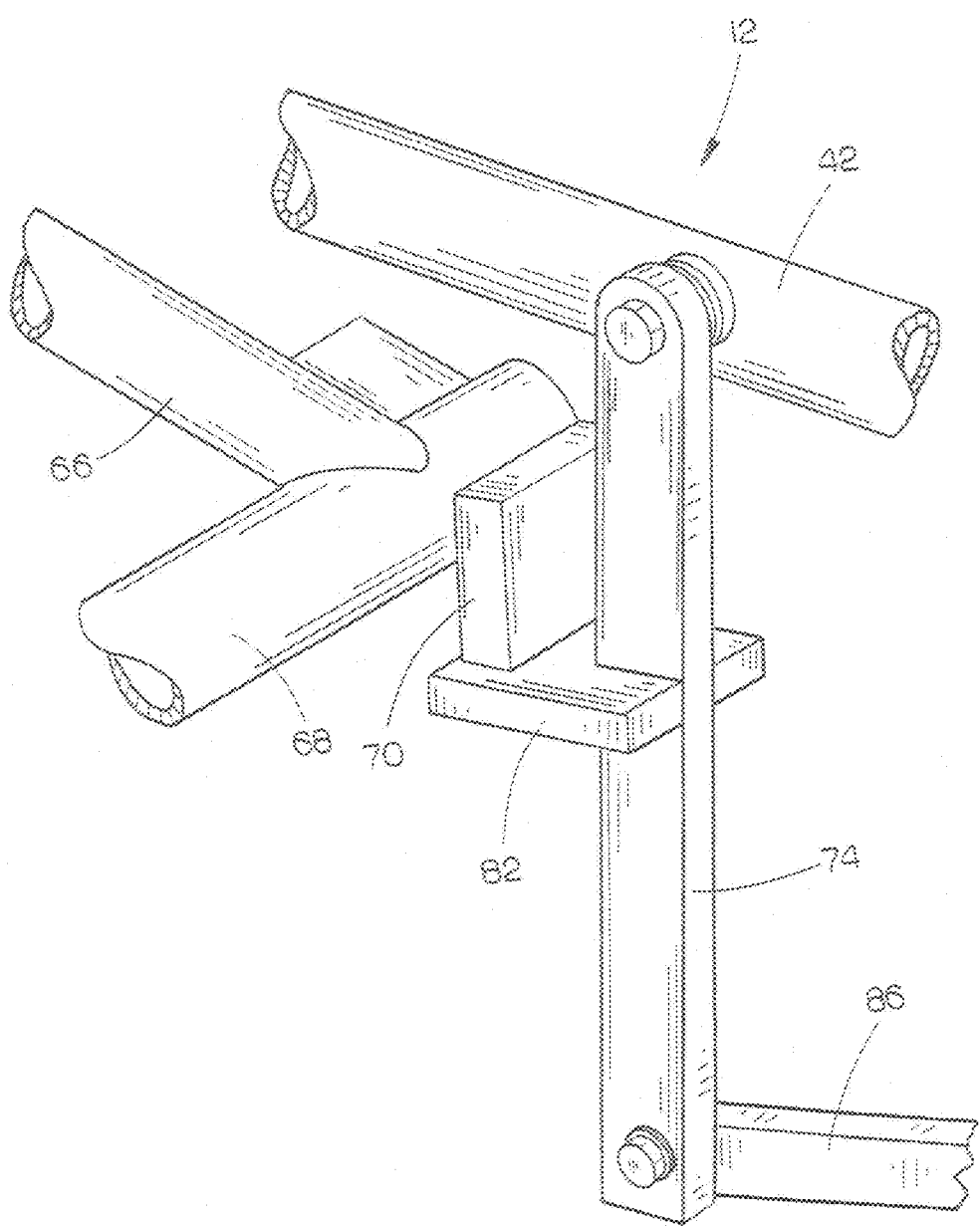
FIG. 4 is a partial perspective view of one of the latching mechanisms of the bale holder.
Figure 5:
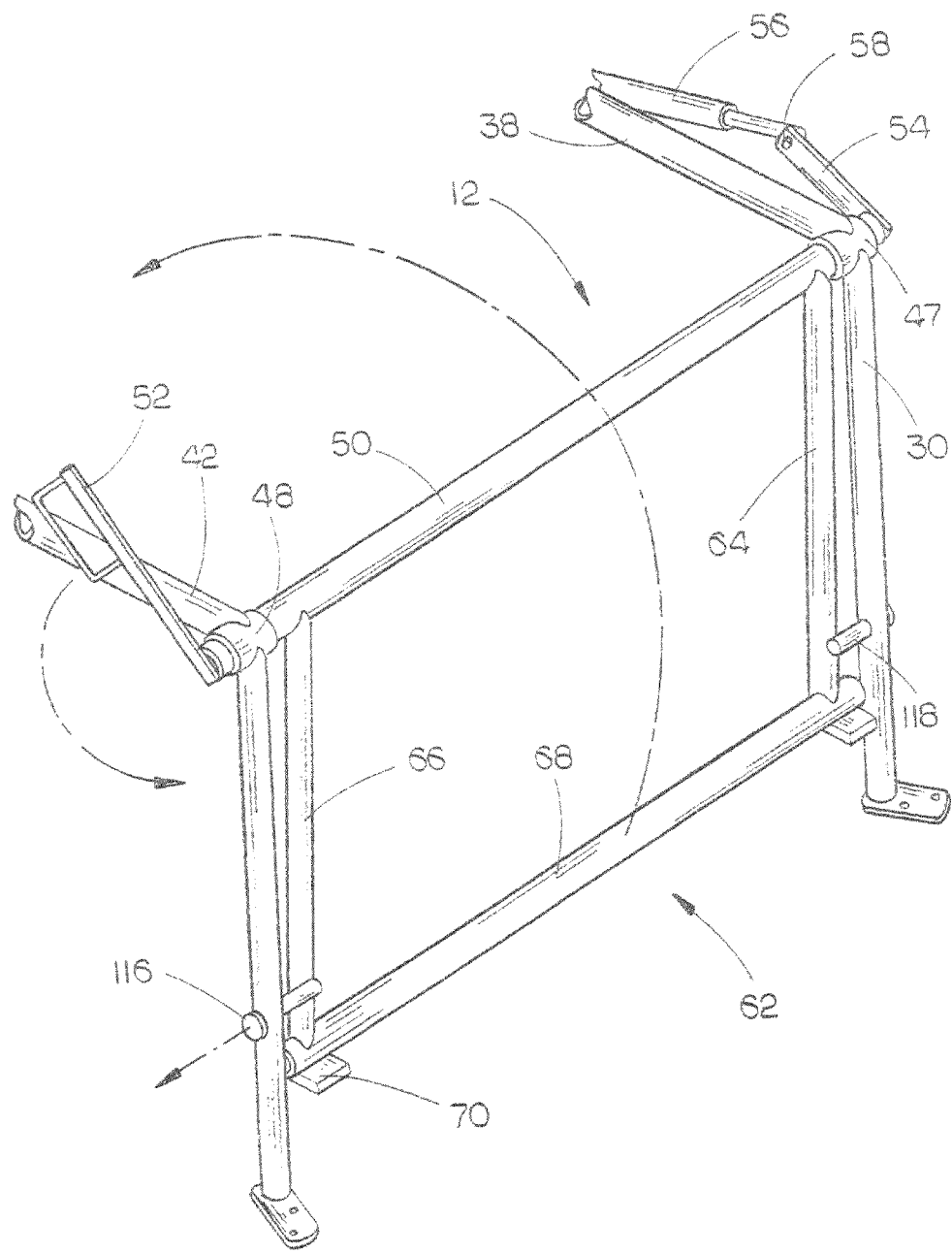
FIG. 5 is a perspective view illustrating the door or shelf portion of the bale holder in its non-bale supporting position.

Bale holder 12 includes four vertically disposed posts 30, 32, 34 and 36 having lower and upper ends. The lower ends of posts 30, 32, 34 and 36 are secured to the frame members 18, 20, 22 and 24 by clamps 37. The numeral 38 refers to a horizontally disposed frame member which extends between posts 30 and 36. As seen in FIG. 3, the upper end of post 30 is welded to frame member 38 inwardly of the end of frame member 38. The upper end of post 36 is adjustably secured to frame member 38 by a clamp 40. The numeral 42 refers to a horizontally disposed frame member which extends between posts 32 and 34. The upper end of post 32 is welded to frame member 42 inwardly of the end of frame member 42. The upper end of post 34 is selectively adjustably secured to frame member 42 by a lamp 44. A horizontally disposed frame member 46 is welded to the ends of frame members 38 and 34 and extends therebetween.

Figure 2:
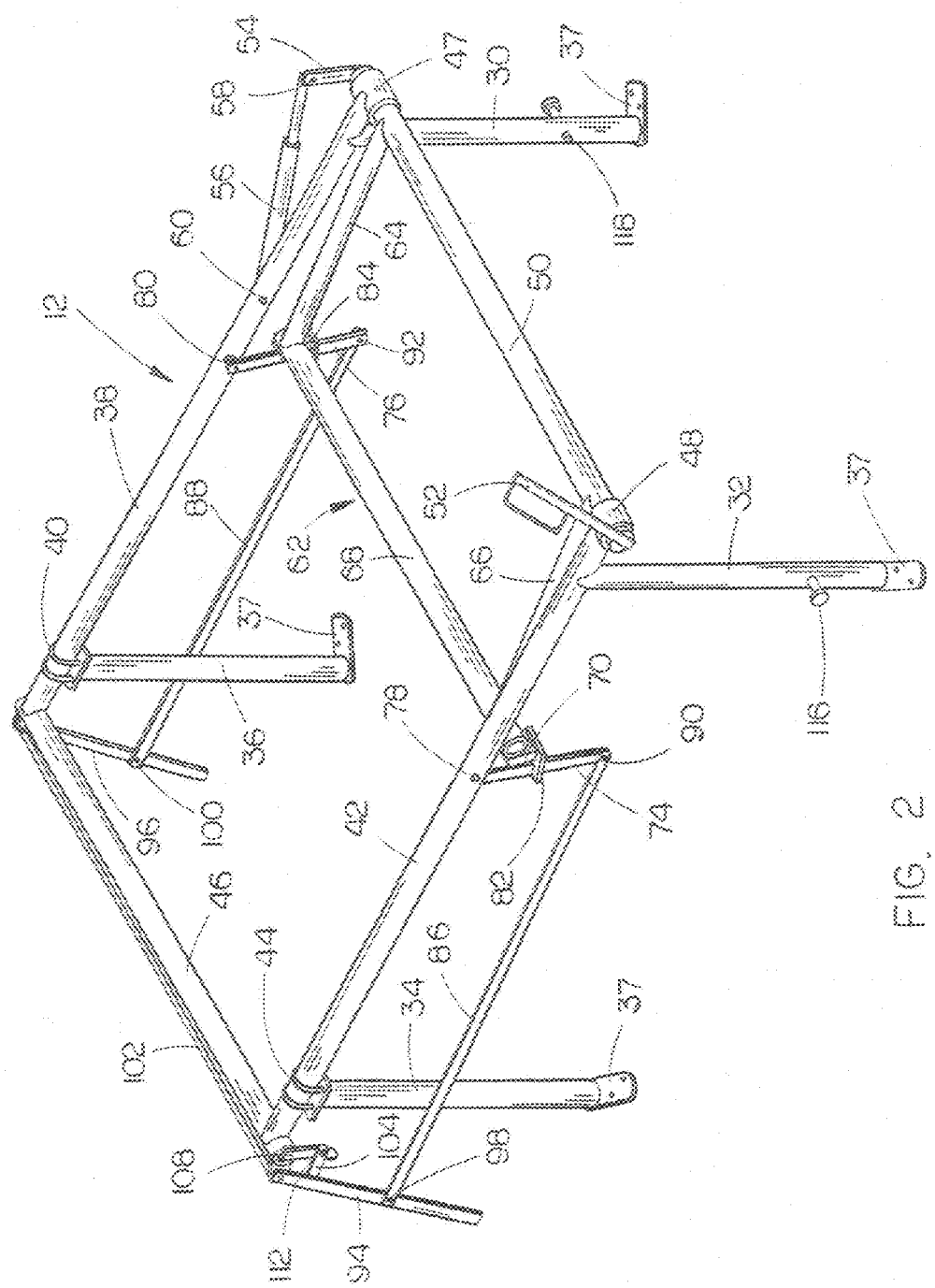
FIG. 2 is a perspective view of the bale holder of this invention.

Horizontally disposed collars or sleeves 47 and 48 are welded to the ends of frame members 38 and 42 respectively outwardly of posts 30 and 32. An elongated pipe 50 is rotatably mounted in collars 47 and 48 and extends therebetween as seen in FIGS. 2 and 3. An operating handle 52 is welded to one end of pipe 50. An arm 54 is welded or otherwise secured to the other end of pipe 50. A gas spring 56 has its rod end pivotally secured to the outer end of arm 54 at 58 and has its base end pivotally secured to frame member 38 at 60.

Pipe 50 forms a portion of a pivotal door 62. Door 62 includes a pair of pipes 64 and 66 which have one end thereof welded to pipe 50 as seen in FIG. 2. A pipe 68 is welded to the other ends of pipes 64 and 66. Latching lugs 70 and 72 are welded to the opposite ends of pipe 68 respectively and extend transversely therefrom.

Latching arms 74 and 76 have their upper ends pivotally secured to frame members 42 and 38 respectively at 78 and 80 respectively. Latching arms 74 and 76 have stop plates 82 and 84 secured thereto respectively which are in the pivotal path of latching lugs 70 and 72 respectively.

Elongated links 86 and 88 are pivotally secured to the lower ends of arms 74 and 76 respectively at 90 and 92 respectively. The other ends of links 86 and 88 are pivotally connected to handles 94 and 96 at 98 and 100 respectively.

An elongated shaft 102 is rotatably secured to frame member 46 at the outer side thereof and extends between the ends thereof. The upper ends of handles 94 and 96 are fixed to the ends of shaft 102 to enable either of the handles 94 or 96 capable of rotating shaft 102. Locking bars 104 and 106 have one end thereof fixed to handles 94 and 96 respectively and have locking pin openings formed therein at the outer ends thereof. Locking bars 108 and 110 have their upper ends fixed to the ends of frame member 46 and have locking pin openings formed therein at the lower ends thereof which are adapted to register with the locking pin openings in bars 104 and 106 respectively so that locking pins 112 and 114 may be inserted therein to lock the handles 94 and 96 in a safety position.

A stop pin or bolt 116 is horizontally movably mounted in post 32 and a stop pin or bolt 118 is horizontally movably mounted in post 30. The stop pins 116 and 118 are selectively movable with respect to posts 32 and 30 between an outer position to an inner position when the stop pins 116 and 118 are in their inner positions, the inner ends of the stop pins 116 and 118 are in the pivotal path of pipe 68 as will be explained hereinafter.

Figure 6:
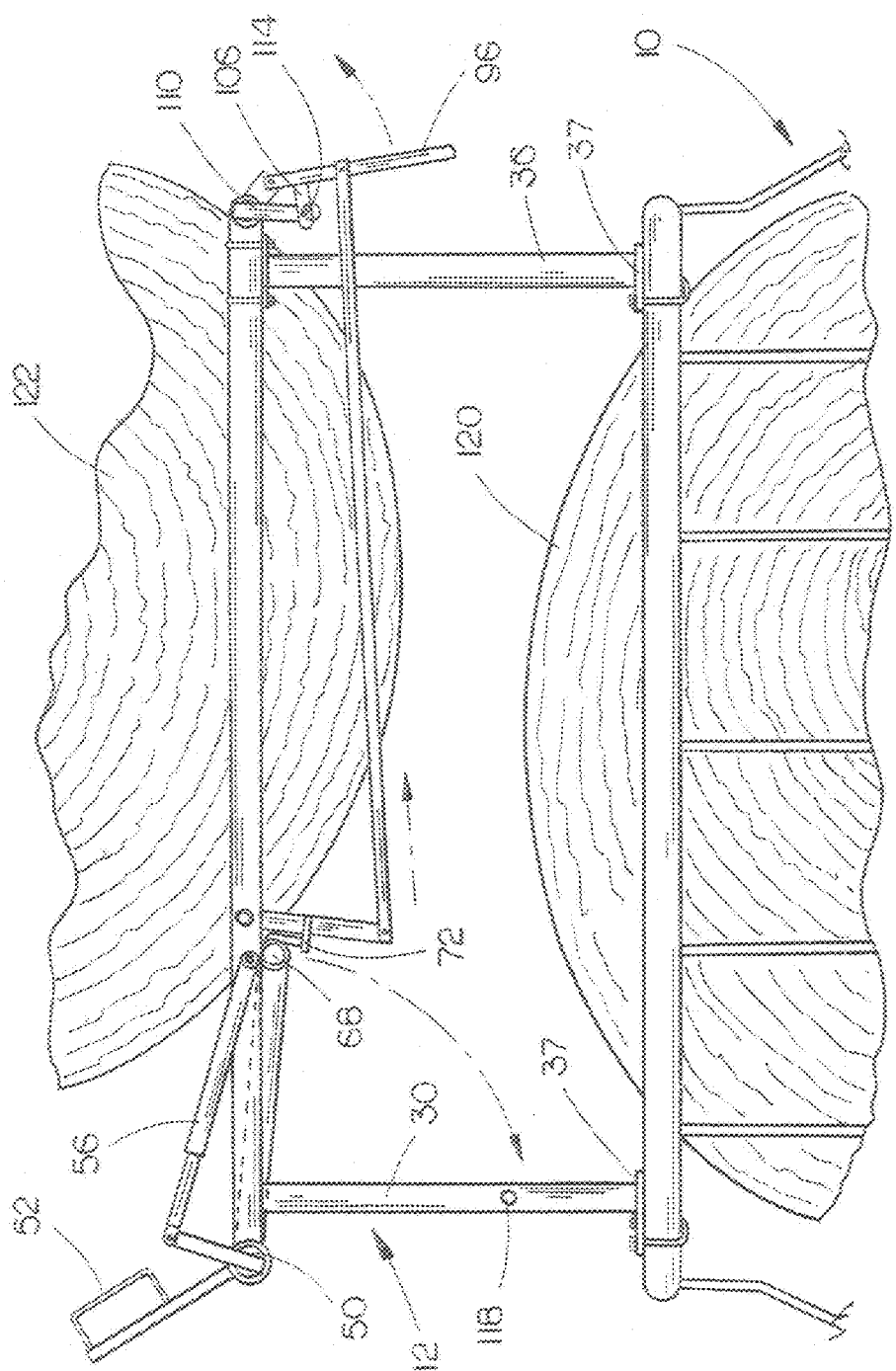
FIG. 6 is a partial side view illustrating the bale holder in its bale supporting position.
Figure 7:
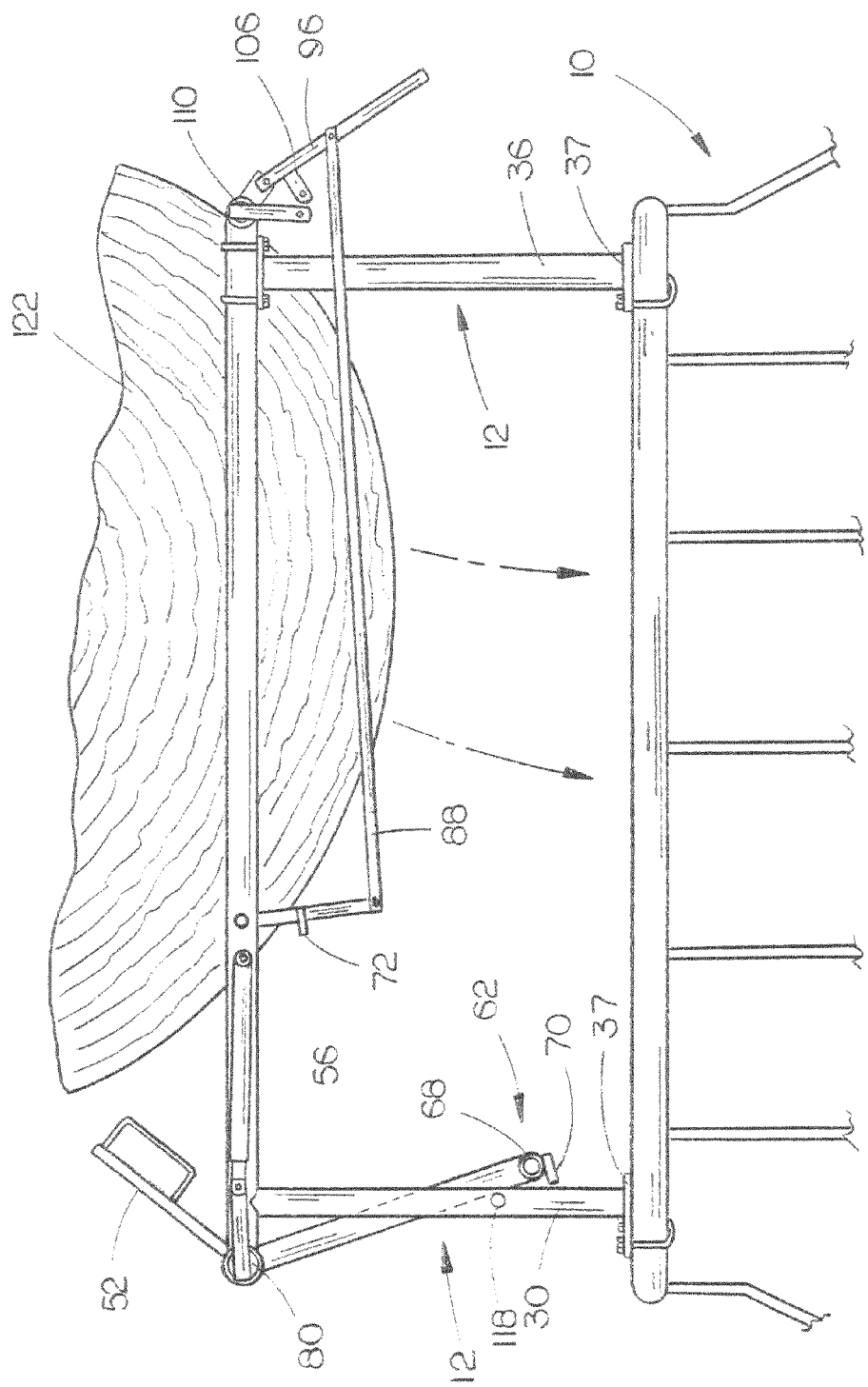
FIG. 7 is a view similar to FIG. 6 except that the bale supporting door has been moved to its second position.

The numeral 120 refers to a bale 120 which is positioned within the feeder 10 while the numeral 122 refers to the stand-by or back-up bale which may be supported on the door 62 and the frame member 46 when the door 62 is in its bale supporting position of FIGS. 1, 3 and 6.

Figure 8:
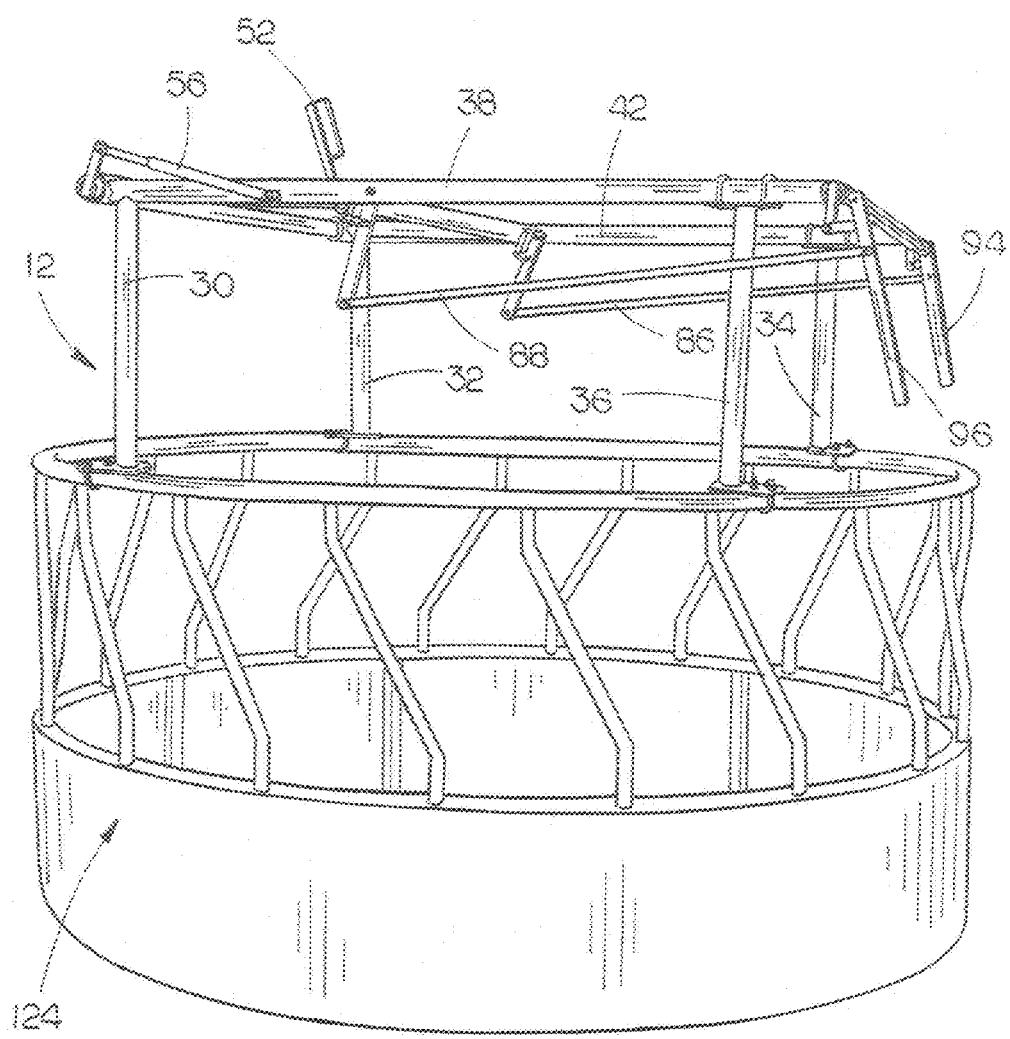
FIG. 8 is a perspective view illustrating the bale holder of this invention mounted on the upper end of a round feeder.

In FIG. 8, the numeral 124 refers to a circular or round bale feeder. As seen, the bale holder 12 may also be used with a circular or round bale feeder.

In use, the bale holder 12 is attached to the upper end of the bale feeder 10 by the clamps 37. The adjustable attachment of posts 34 and 36 to the frame members 42 and 38 respectively permits the bale holder 12 to be attached to bale feeders having different sizes. The bale holder 12 may be attached to square, rectangular or round bale feeders as seen in the drawings.

Assuming that the door 62 is initially in the bale supporting position of FIG. 3, the door 62 must be opened to permit the bale 120 to be placed in the bale feeder 10. The door 62 is opened as will now be described. The stop pins 116 and 118 are slidably moved inwardly in posts 32 and 30 so as to be in the pivotal path of pipe 68. The locking pins 112 and 114 are then removed to permit the handles 94 and 96 to be moved. One of the handles 94 is then pivotally moved in a clockwise direction as viewed in FIG. 3. The pivotal movement of handle 94 will also cause handle 96 to pivotally move since they are interconnected by way of the shaft 102. The pivotal movement of the handles 94 and 96 causes stop plates 82 and 84 on arms 74 and 76 to pivotally move away from the latching lugs 70 and 72 respectively. Since the door 62 is no longer supported by the stop plates 82 and 84, the door 62 swings downwardly from its bale supporting position to a vertically disposed position between the posts 30 and 32. The swinging movement of the door 62 is restrained somewhat by the gas spring 56. The stop pins 116 and 118 limit the outwardly swinging movement of the door 62 thereby preventing the swinging door 62 from striking a person or animal thereby. When the door 62 has been opened, a bale 120 may be placed in the bale feeder 10.

When the bale 120 has been placed in the bale feeder 10, the following steps are taken to ready the bale holder 12 for supporting a bale 122 thereon. The handles 94 and 96 are then pivoted in a counter-clockwise direction as viewed in FIG. 2 until the locking pin openings in 104, 108, 106 and 110 register. Locking pins 112 and 114 are then installed. Stop pins 116 and 118 are then slidably moved to their outer positions relative to posts 32 and 30.

Handle 52 is then grasped and rotated in a counter-clockwise direction as viewed in FIG. 2 which causes door 62 to rotate in a counter-clockwise position as viewed in FIG. 2 until the latching lugs 70 and 72 engage stop plates 82 and 84 respectively so that door 62 is maintained in its bale supporting position of FIG. 2.

The bale 122 is then placed onto the upper end of bale holder 12 so as to be supported on the frame member 46 and the door 62. When the bale 120 has been consumed by the livestock, a worker then pulls the locking pins 112 and 114. Stop pins 116 and 118 are slidably moved inwardly relative to posts 32 and 30 respectively. Either of the handles 94 and 96 are then pivotally moved in a clockwise direction, as viewed in FIG. 2, so that stop plates 82 and 84 are pulled from beneath latching lugs 70 and 72 respectively which causes door 62 to swing downwardly, by the weight of the bale 122, so that bale 122 drops downwardly into bale feeder 10. Although a mechanical means is provided for unlatching the door 62, the latching mechanism could be remotely controlled.

The swinging movement of door 62 is retarded by the gas spring 56 and the stop pins 116 and 118 prevent the door 62 from swinging outwardly and striking a person or an animal thereby.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A back-up bale feeder, comprising:

an upstanding bale feeder enclosure having an open upper end with a horizontally disposed upper frame member extending around said open upper end of said bale feeder enclosure;

said bale feeder enclosure configured to contain a bale therein for feeding animals;

first, second, third and fourth vertically disposed support posts having upper and lower ends;

said lower ends of said first, second, third and fourth support posts being secured to said upper frame member of said bale feeder enclosure with said first, second, third and fourth support posts being horizontally spaced from one another;

a first elongated and horizontally disposed support member having first and second ends;

said upper end of said first support post being secured to said first support member adjacent said first end of said first support member;

said upper end of said second support post being secured to said first support member adjacent said second end of said first support member;

a second elongated and horizontally disposed support member having first and second ends;

said upper end of said third support post being secured to said second support member adjacent said first end of said second support member;

said upper end of said fourth support post being secured to said second support member adjacent said second end of said second support member;

an elongated and horizontally disposed third support member having first and second ends;

said first end of said third support member being secured to said first end of said first support member and which extends transversely therefrom;

said second end of said third support member being secured to said first end of said second support member;

a fourth elongated and horizontally disposed fourth support member having first and second ends;

said first end of said fourth support member being selectively rotatably secured to said second end of said first support member;

said second end of said fourth support member being selectively rotatably secured to said second end of said second support member;

said fourth support member being selectively rotatable between first and second positions;

a handle secured to said fourth support member for rotating said fourth support member from said first position to said second position;

a first handle fixedly secured to one of said first and second ends of said fourth support member to enable said handle to rotate said fourth support members with respect to said second ends of said first and second support members;

a fifth elongated support member having first and second ends;

said first end of said fifth support member being secured to said fourth support member adjacent said first end of said fourth support member with said fifth support member extending transversely from said fourth support member;

a sixth elongated support member having first and second ends;

said first end of said sixth support member being secured to said fourth support member adjacent said second end of said fourth support member with said sixth support member extending transversely from said fourth support member;

a seventh elongated support member having first and second ends;

said seventh support member being secured to said second ends of said fifth and sixth support members and extending therebetween;

said fifth and sixth support members being in a substantially vertically disposed position when said fourth support member is in said first position so as to be positioned inwardly of said second and fourth support members respectively;

said fifth and sixth support members being in a substantially horizontally disposed position when said fourth support member is in said second position so as to be positioned inwardly of said first and second support members respectively;

said seventh support member being in a back-up bale supporting position above said bale feeder enclosure when said fourth support member is in said second position; and a latching structure associated with said first support member and said seventh support member and which is movable between latched and unlatched positions;

said latching structure, when in said latched position and said fourth support member is in said second position, maintaining said seventh support member in said back-up bale supporting position to prevent a back-up bale supported thereon from falling downwardly into said bale feeder enclosure;

said latching structure, when moved from said latched position to said unlatched position and a back-up bale is supported on said seventh support member in said bale supporting position, permits said seventh support member to move downwardly to its inoperative position thereby permitting the back-up bale to fall downwardly into said bale feeder enclosure.

2. The back-up bale feeder of claim 1 wherein said upper frame member has a square configuration.

3. The back-up bale feeder of claim 1 wherein said upper frame member has a rectangular configuration.

4. The back-up bale feeder of claim 1 wherein said upper frame member has a cylindrical configuration.

5. The back-up bale feeder of claim 1 wherein said second and fourth support posts have a movable stop provided thereon to prevent said seventh support member from swinging past vertical when said fourth support pipe pivots from said second position to said first position.

6. The back-up bale feeder of claim 1 further including means for slowing the pivotal movement of said seventh support member from its bale supporting position to said inoperative position.

7. The back-up bale feeder of claim 1 wherein said latching mechanism is remotely controllable.

* * * * *